Sept. 11, 1962  A. QUINCHE ET AL  3,052,926
METHOD OF CLOSING THE OPEN END OF A PLASTIC CONTAINER
Filed Sept. 13, 1954  3 Sheets-Sheet 1

INVENTORS
ALBERT QUINCHE
EDOUARD LECLUYSE
BY Cushman, Darby & Cushman
ATTORNEY

Sept. 11, 1962   A. QUINCHE ET AL   3,052,926
METHOD OF CLOSING THE OPEN END OF A PLASTIC CONTAINER
Filed Sept. 13, 1954   3 Sheets-Sheet 2

INVENTORS
ALBERT QUINCHE
EDOUARD LE CLUYSE
BY
ATTORNEYS

Sept. 11, 1962   A. QUINCHE ET AL   3,052,926
METHOD OF CLOSING THE OPEN END OF A PLASTIC CONTAINER
Filed Sept. 13, 1954   3 Sheets-Sheet 3

INVENTORS
ALBERT QUINCHE
EDOUARD LECLUYSE
BY Cushman, Darby & Cushman
ATTORNEYS

United States Patent Office
3,052,926
Patented Sept. 11, 1962

3,052,926
METHOD OF CLOSING THE OPEN END OF A PLASTIC CONTAINER
Albert Quinche, St.-Sulpice, and Edouard Lecluyse, Vevey, Switzerland, assignors, by mesne assignments, to American Can Company, New York, N.Y., a corporation of New Jersey
Filed Sept. 13, 1954, Ser. No. 455,654
5 Claims. (Cl. 18—59)

This invention relates to a method for sealing the open end of a container of flexible thermoplastic material, the method comprising applying a closure to said end of said container, fusing the material at the adjacent surfaces of said contained and end closure to form a substantially molten bead, and thereafter subjecting said bead to a cold pressure.

One form of apparatus for carrying out such method can include a support to hold the container and closure and a heating device. Rotating means are provided to turn the support and secure a regular and progressive heating on all the adjacent surfaces of said container and end closure. In addition, cold pressure producing means are supplied to flatten the molten bead produced at the adjacent surfaces of said container and end closure.

Heretofore, attempts to permanently affix a plastic end closure to the open end of a thermoplastic container have been unsuccessful. The joint formed was only of a temporary nature and would become defective after rather limited use.

The method utilized in the past to carry out such an operation involved heating and fusing alone with no accompanying cold pressure application on the molten bead. To eliminate resulting adverse effects, we have developed the method previously set forth including the all important step of subjecting to cold pressure the molten bead formed at the adjacent surfaces of the container and the end closure. The advantages afforded by the seal produced include the fact that joint of a permanent nature is realized. Thus, the resulting container remains completely effective even after prolonged and rugged use.

With the above in mind, the principal object of this invention is to provide a method for sealing the open end of a container of flexible thermoplastic material, said method comprising applying a closure to said end of said container, fusing the material at the adjacent surfaces of said container and end closure to form a substantially molten bead, and thereafter subjecting said bead to a cold pressure.

Another object of this invention is to provide a method as noted above wherein said end closure and adjacent area of the container are confined during the cold pressing of the said bead.

A further object of this invention is to provide a method as noted heretofore wherein said fusion is accomplished by radiant heat and wherein said cold pressure is applied axially of the container and end closure.

Still further objects and the entire scope of applicability of the present invention will become apparent from the detailed description given hereinafter. It should be understood, however, that the detailed description, while indicating preferred embodiments of the invention, is given by way of illustration only, since various changes and modifications within the spirit and scope of the invention will become apparent to those skilled in the art from this detailed description.

Figure 1:
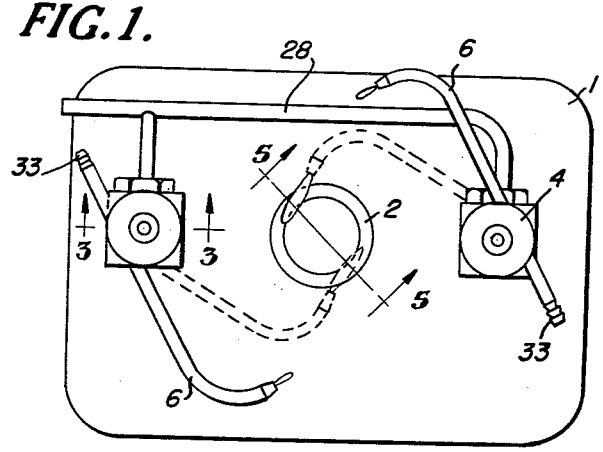
FIGURE 1 is a top plan view of one form of the apparatus.

Our novel method is designed to bring about the formation of a permanent seal between the open end of a container of flexible thermoplastic material and a closure therefor. The process basically involves the following steps. A tubular plastic container is inserted in a support member conforming with the shape of the container and having means to securely fix said container in said support member with its open end upwardly exposed. It is noted that the container to be sealed is one having a straight-sided tubular configuration made, for example, by a process which includes extruding a thin body wall and cutting the same to length. It is apparent that such a construction naturally provides no positioning configuration for cooperation with an end closure, and the same may be effectively characterized by the term "unstepped" which is used hereinafter to designate body wall tubes of the type with which the present invention is concerned. A cup-shaped plastic closure having a peripheral lateral flange thereon is then inserted within the confines of the container, the flange resting on the free edge of the container externally thereof. Thereafter, the support member including the container and closure assembly is rotated while being subjected to heat applied to the adjacent surfaces of said container and end closure. A molten bead is formed and said bead is thereafter subjected to cold pressure. The result is a container having an end closure thereon securely and permanently attached thereto.

The significant aspect of the method involves utilization of cold pressure upon the molten bead. However, other features such as the design of the end closure are important. For example, the thickness and width of the peripheral lateral flange of the closure determines the amount of plastic activation that will result within a specified heating time. A portion of the adjacent container wall must become activated during the same heating time.

Further, in the design of the closure, it is important to provide for a tight fit between the closure and the container wall in order to insure pressure at the joint during heating and sealing. With this in mind, the support member should have an inner diameter of proper dimension in order to exert the pressure between the container end wall and the closure member.

Another feature that should be noted is the fact that the location of the thermoplastic container relative to the upper end of the support member is important in order that the proper amount of container end wall will be exposed to heat. This will help to determine the appearance as well as the effectiveness, to a certain extent, of the resulting joint.

The application of heat for activation should be uniform around the periphery of the sealing area. As noted heretofore, the method used in practice is to rotate the support assembly relative to the source of heat. Various heating means may be utilized but radiant heating appears to be the best as a practical matter.

Throughout this specification, we have stressed the importance of the novel cold pressure step of the method. The exact physical effect that such cold pressure step has on the resulting seal is not completely ascertainable but one explanation may be as follows.

When the plastic closure is heated, the surface tension of the plastic material causes the formation of a bead. After sufficient heating time, the bead is drawn inwardly to rest on the edge of the container end wall. Additional heat will cause the bead to move inwardly from the outside periphery of the container end wall. When cold pressure is applied to a relatively cool flat member acting axially of the container and closure, the major portion of the molten material in the bead is pushed down inside the closure cavity to form a permanent union between the container and the closure.

Figure 5:
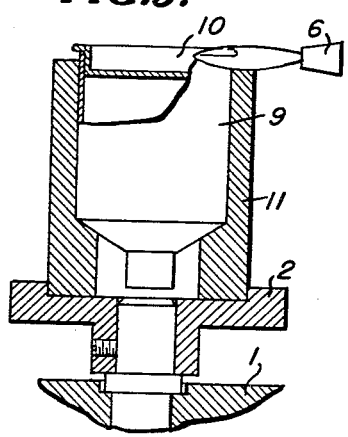
FIGURE 5 is an enlarged sectional view taken on the line 5—5 of FIGURE 1.
Figure 9:
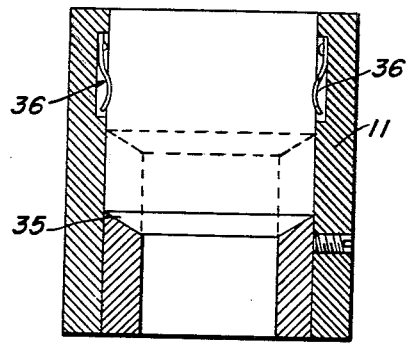
FIGURE 9 is a side elevation view illustrating means for varying the depth of the support member and for securing the container in the support.

An example that is illustrative of our novel process for sealing the end of a container embodies the following basic steps as illustrated by the drawings. Referring to FIGURE 5, we see illustrated the support member 11 having positioned therein the container 9 and the closure 10. The support member includes the adjustable collar 35 (FIGURE 9) for adjustment of the depth of the support member to handle containers of different lengths. In addition, note the spring members 36 mounted in the openings in the support member wall for the purpose of gripping the container to hold the latter in a fixed position.

After the closure and container are positoned as illustrated in FIGURE 5, a heating means such as burners 6 or a radiant heating ring (not illustrated) are brought into proximity to the adjacent surfaces of the container and end closure. This step is well illustrated in FIGURES 1 and 5.

Figure 7:
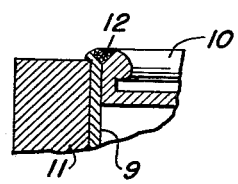

While heat is being applied, the support member assembly is being rotated in order to form a uniform substantially molten bead 12 shown in FIGURE 7. The characteristics of this bead are substantially as described heretofore.

Figure 11:
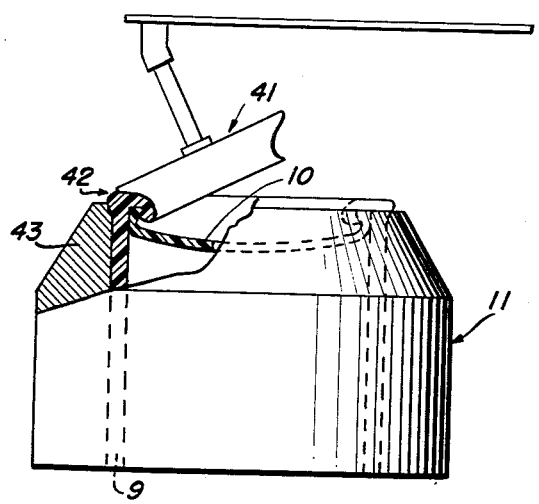
FIGURE 11 is a side elevation view illustrating a further modified means for applying cold pressure to the molten bead.
Figure 8:
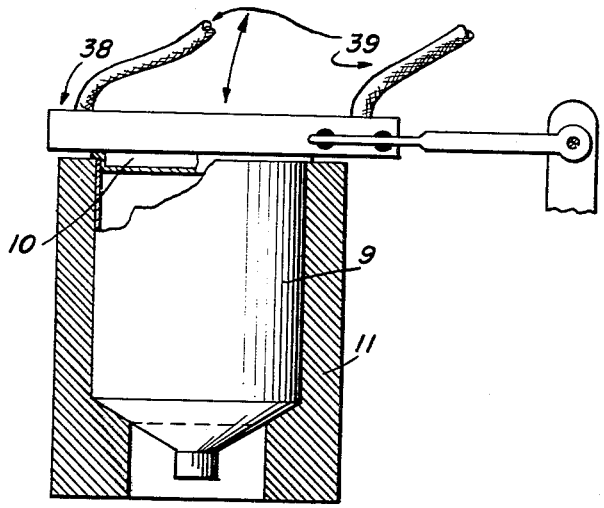
FIGURE 8 is a side elevation view illustrating one means of applying cold pressure to the molten bead.
Figure 10:
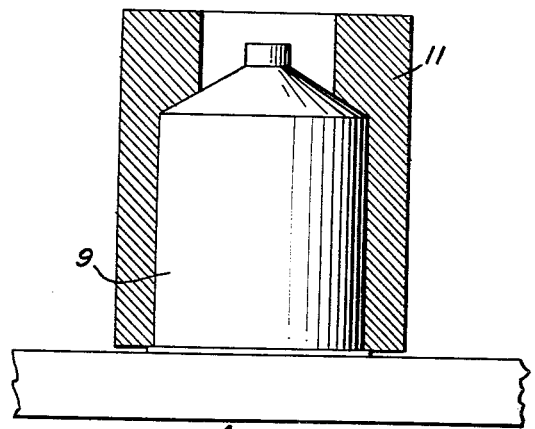
FIGURE 10 is a side elevation view illustrating a modified means for applying cold pressure to the molten bead.

Upon the formation of the bead, the heating means is withdrawn and cold pressure is applied. This cold pressure can be supplied by various means as illustrated in FIGURES 8, 10 and 11. FIGURE 8 illustrates a preferred pressure producing means comprising a cold patter element 38. This patter is cooled by water running through tubes 39. The patter is placed above the container and closure assembly and can either be manually or automatically pressed thereon. The cold pressure imposed by this patter constitutes the final step in the process and results in a container of permanent and durable character.

An alternative means for supplying this cold pressure is illustrated in FIGURE 10. A simple expedient is utilized in that, upon the formation of the substantially molten bead 12, the support member assembly is merely removed from revolving disc 2, inverted, and placed on a smooth cold metal plate 40. This results in cold pressure being applied to the molten bead due to the combined effect of the metal plate and the weight of the support member 11.

A further means for supplying the necessary pressure to the molten bead is well illustrated in FIGURE 11. Illustrated therein is the use of a rotatable roller member 41 to progressively apply pressure to the molten bead in a substantially radial direction. The bead is pressed between the roller member and the wall of the tubular support member 42 adjacent said bead. It should be noted that the illustrated roller member has a concave surface 43 operating to shape the molten bead to a specific form.

An example of the apparatus that has been used to carry out the method described heretofore, is illustrated in the drawings, particularly in FIGURES 1 through 5.

The machine represented includes a frame 1, having a disc 2 mounted thereon. This disc 2 is rotated by means of electric motor 3 mounted in the frame. Burner holders 4 are placed on each side of the frame. Each of these burner holders (one of which is illustrated in detail in FIGURE 3) includes a vertical spindle 5 whose base swivels in frame 1 and holds a burner 6 mounted in support collar 7, said support collar fixing the burner by clamping screw 8.

Figure 6:
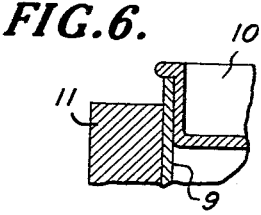
FIGURES 6 and 7 represent enlarged fragmentary views of a container provided with its bottom, before and after the welding of the latter.

The disc 2 is rotatable continuously by motor 3, as noted heretofore. Referring to FIGURE 5, we note support member 11 mounted on disc 2 and provided with container 9 and closure member 10. Also illustrated is the heating action of burner 6 which results in formation of the substantially molten bead 12 illustrated in FIGURE 7. FIGURE 6 merely shows the adjacent surfaces of the container and end closure prior to heating.

In order to insure the heating of the container and closure, only for the time necessary to obtain the desired molten bead, the apparatus includes a control assembly mounted in frame 1 and operating in such a way that burners 6, previously brought, by the rotation of spindles 5, into a heating position represented by dotted lines in FIGURE 1, will automatically resume, after a specified time, their withdrawn position represented by solid lines in FIGURE 1.

The two spindles 5 each has a small rod 13 connected with one another by coupling element 14, which insures their simultaneous rotation. A spring 15 urges element 14 against a stop screw 16 in the position illustrated in FIGURE 2 and corresponding to the rear position of burners 6.

Basically, the following steps occur. Actuation of control lever 17, swivelled in element 18 secured to the frame, shifts element 14 towards the left from the position shown to thereby turn the spindle 5 and thus bring burners 6 to their heating position. A latch 19 pivoting around point 20 engages notch 21 to thereby hold the element 14 in its new position against the action of spring 15 for a specified time. Before this notch 21 can operate in this way, a stop 22 is first removed due to the action of control lever 17 actuating lever 23 during its pivotal movement. The driving of lever 23 occurs through stop screw 24 only at the end of the pivoting of control lever 17.

The pivoting of lever 23 about element 18, besides moving stop 22, causes the displacement of a pusher 25 of a time-adjustable electric releaser 26, thus beginning the time cycle.

Figure 2:
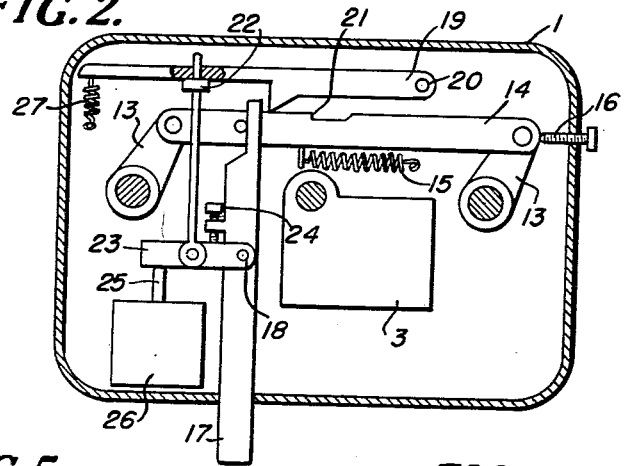
FIGURE 2 is a sectional plan view of the apparatus partially in section illustrating the means for rotating the illustrated burners.

After the adjustment time of the releaser has passed, the pusher 25 resumes its initial position illustrated in FIGURE 2 and pushes back lever 23 and stop 22. The latter element in its turn pushes back the latch 19 against the action of spring 27. This movement releases element 14 which resumes its initial position under the action of spring 15 and returns the burners 6 to their rear position and the control lever 17 to its initial position.

The operator of the apparatus then replaces support member 11 with another support member in which is placed a container and closure to be joined. He then sets in motion control lever 17 to bring forward the burners and simultaneously switch on the automatic releaser 26 which will cause the withdrawal of the burners after a specified time as noted above.

Figure 4:
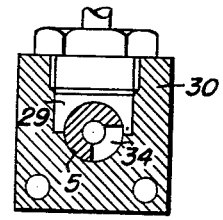
FIGURE 4 is an enlarged section taken on the line 4—4 of FIGURE 3.
Figure 3:
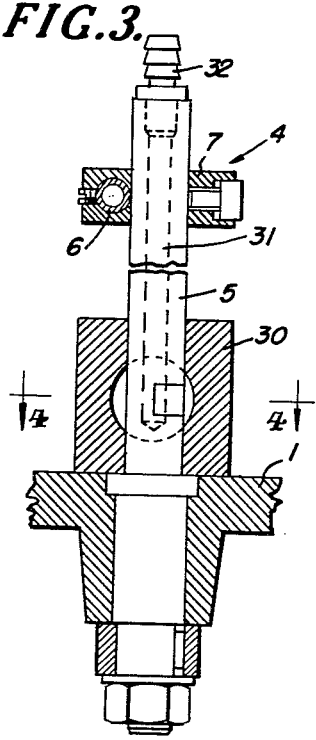
FIGURE 3 is an enlarged sectional view taken on the line 3—3 of FIGURE 1.

In order to reduce the gas consumption in the illustrated apparatus, the burner holders 4 are provided with valves automatically securing the low burning of burners 6 when the latter are in the rear position. This feature is hereinafter described, and is illustrated in FIGURES 3 and 4.

To reach the burners, gas goes through a cylindrical groove 29 bored in block 30 which is screwed to frame 1. This groove 29 is crossed by spindles 5 and provided with an axial duct 31. Associated with duct 31 are couplings 32 and 33 which go to the gas supply (not shown). The spindle 5 has a radial aperture 34 securing the passage of gas between groove 29 and duct 31. The opening of this aperture 34 extends over a quarter of the periphery of spindle 5 in such a way that the opening left for entry of gas is very much reduced when the burner is in its rear position and conversely increases, when the burner is brought in front position after the rotation of spindle 5.

It should be noted that burners 6 are adjustable in height by moving collar 7 along spindle 5. The burners are also radially adjustable by rotating the burner in said collar 7. Thus, the apparatus may easily be adapted for application to containers of various dimensions.

As noted heretofore, the apparatus illustrated in the drawings is only one means of carrying out our novel method. For example, a radiant heating ring, not shown, can be easily substituted for the burners.

Our novel method is applicable to thermoplastic containers in general. However, we find it particularly suitable in the sealing of containers of polyethylene or polyvinyl chloride.

By our novel process we have succeeded in producing a container which yields the advantages set forth above. As a result of this process, a joint is produced of such strength and durability as to obviate the problems that have heretofore been prevalent in the plastic container field.

The novel principles of this invention are broader than the specific embodiment recited above and rather than unduly extend this disclosure by attempting to list all the numerous modifications which have been conceived and reduced to practice during the course of this development, these novel features are defined in the following claims.

We claim:

1. A method of sealing the end of a container body of flexible thermoplastic material comprising placing a cup-shaped transverse end closure member of thermoplastic material in the open end of the container body, heating the marginal portions of the body and closure by radiant heat only to soften said margins and form a substantially molten bead projecting axially from the container end, discontinuing said heating, and thereafter subjecting the bead to cold pressure to consolidate the same into a firm, leak-proof container body to end closure joint.

2. A method for sealing the end of an unstepped tubular container body of flexible thermoplastic material comprising inserting the open-ended container body in a tubular support member with an open end exposed, placing in the exposed open end of the body a snugly fitting plastic end closure with a radially outwardly projecting flange and with the flange resting against the free end edge of the container body, heating the closure flange and container body margins to soften both and form a substantially molten bead, discontinuing said heating, and thereafter applying to said bead a cold pressure to secure a firm, leak-proof container body to end closure joint.

3. A method as claimed in claim 1 wherein the cold pressure is applied by bringing a substantially flat cold pressure element into contact with the bead by moving the same towards the container body in a direction axially thereof.

4. A method as claimed in claim 2 wherein the cold pressure is applied by applying substantially radial pressure to an incremental area of the bead between a cold pressure element and the tubular support member, and moving the element about the bead to progressively apply cold pressure thereto.

5. The method of permanently securing a fusible thermoplastic closure having a marginal edge portion to an end wall of an open fusible thermoplastic container, the maximum transverse dimension of the marginal edge portion of the closure being larger than the maximum external dimension of the marginal edge of the container end wall, comprising the steps of: (1) placing said closure on said end wall with the marginal edge portion of the closure extending radially outwardly of the marginal edge of the end wall, (2) supporting the container in a region spaced from the end wall with said end wall free of lateral support, and (3) applying heat and pressure to said fusible marginal edge portion of said closure to fuse the same to said end wall and to mold said marginal edge portion into a bead of bulbous cross section.

References Cited in the file of this patent

UNITED STATES PATENTS

| | | |
|---|---|---|
| 751,300 | Kinnard | Feb. 22, 1904 |
| 1,462,522 | Scott | July 24, 1923 |
| 1,735,668 | Beuge et al. | Nov. 12, 1929 |
| 2,030,066 | Jenett | Feb. 11, 1936 |
| 2,045,471 | Kasen | June 23, 1936 |
| 2,274,827 | Emmerich | Mar. 3, 1942 |
| 2,546,208 | Barton | Mar. 27, 1951 |
| 2,626,647 | Barton | Jan. 27, 1953 |
| 2,642,911 | De Shazor | June 23, 1953 |
| 2,678,471 | Barton | May 18, 1954 |
| 2,679,469 | Bedford | May 25, 1954 |
| 2,710,986 | Gray | June 21, 1955 |
| 2,790,941 | Dawson | Apr. 30, 1957 |

FOREIGN PATENTS

| | | |
|---|---|---|
| 701,639 | Great Britain | Dec. 30, 1953 |